United States Patent
Nagel

[19]

[11] Patent Number: 5,814,353
[45] Date of Patent: Sep. 29, 1998

[54] PLASTIC INJECTION MOLDING ELECTROHYDRAULIC MACHINE HYBRID DRIVE WITH JOINT FREQUENCY CONVERTER

[75] Inventor: Gunther Nagel, Steinheim, Germany

[73] Assignee: Voith Turbo GmbH & Co. KG, Heidenheim, Germany

[21] Appl. No.: 739,176

[22] Filed: Oct. 30, 1996

[30] Foreign Application Priority Data

Nov. 2, 1995 [DE] Germany .................. 195 40 695.8

[51] Int. Cl.$^6$ ............................................. B29C 45/77
[52] U.S. Cl. ..................... 425/149; 264/40.7; 425/166
[58] Field of Search ................... 425/149, 166, 425/63, 456; 264/40.7

[56] References Cited

U.S. PATENT DOCUMENTS

| | | | |
|---|---|---|---|
| 3,655,311 | 4/1972 | Porter | 425/166 |
| 4,830,597 | 5/1989 | Steier et al. | 425/456 |
| 4,988,273 | 1/1991 | Faig et al. | 425/149 |
| 5,123,831 | 6/1992 | Enqvist et al. | 425/63 |
| 5,362,222 | 11/1994 | Faig et al. | 425/149 |

FOREIGN PATENT DOCUMENTS

| | | |
|---|---|---|
| 4231784 | 3/1994 | Germany . |
| G9408542.0 | 9/1994 | Germany . |

OTHER PUBLICATIONS

Dubbel–Taschenbuch for Maschinenbau, 18. Edition, pp. V23FF.

*Primary Examiner*—Tim Heitbrink
*Attorney, Agent, or Firm*—Baker & Daniels

[57] ABSTRACT

An electrohydraulic hybrid drive for a plastic injection molding machine having at least one hydraulic actuator, at least one feed system for feeding the hydraulic fluid for actuation of the hydraulic actuators, at least one electric motor for operating the feed system for the hydraulic actuators, at least one further electric motor for driving the extruder screw of a plasticator device, a joint frequency convertor which actuates both of the electrical motors and a switching device circuited between the frequency converter and at least one of the electrical motors.

21 Claims, 1 Drawing Sheet

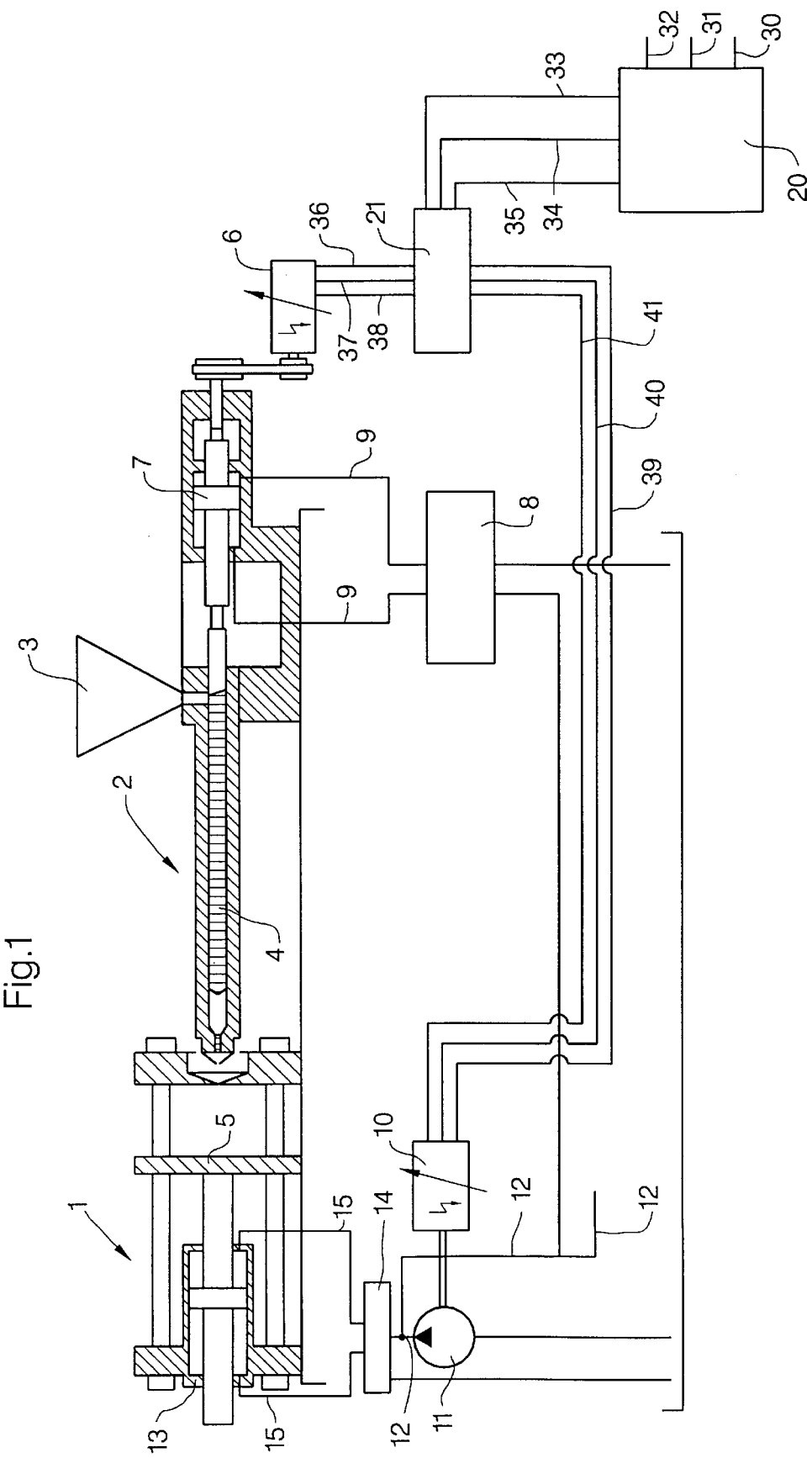

PLASTIC INJECTION MOLDING ELECTROHYDRAULIC MACHINE HYBRID DRIVE WITH JOINT FREQUENCY CONVERTER

BACKGROUND OF THE INVENTION

1. Field of the Invention.

The present invention relates to an electrohydraulic hybrid drive for plastic injection molding machine. Electrohydraulic hybrid drives include at least one hydraulic actuator, at least one feed system to feed hydraulic fluid for actuation of the hydraulic actuators, at least one electric motor to drive the feed system for the hydraulic actuator, and at least one further electric motor to drive the extruder screw of a plasticator.

2. Description of the Related Art.

In the field of plastic injection molding machinery, as in many other areas of machine manufacture, ever greater importance is being attached to energy savings and cost reduction. The availability of compact and low-cost electrohydraulic drive units such as those known from German utility model G 94 08 542.0 or from DE 42 31 784 permit the realization of considerable energy savings when using these drive units to drive or actuate tools. The drive source of electrohydraulic hybrid drives are electric motors which typically feature additional elements, such as frequency converters, control units and regulating units, for adapting the motors to different operating conditions. The individual devices or elements are interconnected, which has proved to be very expensive. This is particularly true for the frequency converters required for each motor and which are necessary for activating the electric motors. This has the disadvantage that plastic injection molding machines with an electrohydraulic hybrid drive are characterized by high floor space demands and high manufacturing costs.

SUMMARY OF THE INVENTION

The objective of the present invention is to provide an electrohydraulic hybrid drive for a plastic injection molding machine where the disadvantages of the prior art are overcome and which is inexpensive and easy to use. The number of components required, notably frequency converters, is to be minimized.

The present invention comprises, in one form thereof, a hydraulic actuator, at least one feed system to feed hydraulic fluid for actuation of the hydraulic actuator, at least one electric motor to drive the feed system for the hydraulic actuator, at least one further electric motor to drive the extruder screw of the plasticator and a switching device and joint frequency converter for both of the electric motors.

If the machine is designed for sequential operation, that is, with the operational sequences powered by the electric motors taking place successively rather than simultaneously, the switching device is fashioned as a throw-over switch so that only one of either the electric motor for driving the extruder screws or the electric motor for operating the feed system of the hydraulic actuators is energized.

Other embodiments of the invention may have one electric motor arranged parallel to the other electric motor, e.g., the electric motor which drives the feed system may be operated parallel to the electric motor which drives the extruders screws. That is, the electric motor of a pump driving the hydraulic feed system may be permanently connected to the frequency converter and the electric motor for the extruder screw is, by means of a switch, connected to the line powering the electric motor of the pump. This makes it possible to operate both electric motors simultaneously or only the electric motor of the pump. Alternatively, the electric motor for the extruder screw may be permanently connected to the frequency converter and the electric motor for the pump connected, by means of a switch, to the line powering the extruder screw motor.

The feed system for feeding hydraulic fluid for actuation of the hydraulic actuators may include a speed-controlled fixed-displacement pump or a variable-displacement pump.

Triphase asynchronous motors that allow an especially easy speed control may be used as the electrical motors for the plastic injection molding machine. The triphase motors may be energized by way of an indirect converter.

The hydraulic actuators are favorably fashioned as cylinders.

The wiring may be simplified by using the same design for all of the electric motors of the drive system. Additionally, the electric motors may have the same rating.

If the electric motors must be differently rated, the relevant parameter sets of the electric motors may be changed in the frequency converter at throw-over when the different electrical motors cut-in or cut-out.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawing, wherein:

FIG. 1 is a schematic illustration of a plastic injection molding machine with an electrohydraulic hybrid drive according to the present invention.

DESCRIPTION OF THE PRESENT INVENTION

FIG. 1 is an embodiment of a plastic injection molding machine comprising a tooling section 1 and a plasticating section 2. Supplied, e.g., through the hopper 3 of the plastic extruder, the plastic granulate is, with the aid of the extruder screw 4, plasticated in the plasticating section 2. The plastic material can then be molded with the aid of a tool 5 in the tooling section 1. The extruder screw 4 is powered by an electric motor 6 which, in the illustrated embodiment, is favorably designed as a speed-controlled triphase asynchronous motor of conventional make, such as one known from "Dubbel" Taschenbuch für den Maschinenbau [Mechanical Engineering Handbook], 18. edition, pp. V 23 ff. The present embodiment of the plastic extruder also features a hydraulic actuator 7, in addition to the extruder screw 4, for injection of the plastic material. The hydraulic actuator 7 is a cylinder in the illustrated embodiment. The hydraulic actuator 7 is controlled hydraulically by means of the control system 8. The hydraulic control lines 9 extend from the control system 8 to the cylinder and carry an operating medium, a hydraulic fluid in the illustrated embodiment, to and from cylinder 7. Hydraulic fluid is conveyed to the control system 8 by means of a feed device, pump 11 in the illustrated embodiment, via the hydraulic feed line 12. Pump 11 is driven by an electric motor 10. In the present embodiment, the electric motor 10 for the pump is a triphase asynchronous motor, preferably of the same design as the triphase asynchronous motor 6 used to drive the extruder screw 4.

The tooling section 1 has a hydraulic actuator 13 for actuation of tool 5. Hydraulic actuator 13, as well as hydraulic actuator 7, is designed as a cylinder. Hydraulic actuator 13 actuates tool 5, for instance to move the tool or build up a specific operating pressure. The hydraulic actuator 13 is controlled by a second hydraulic controller 14 and hydraulic lines 15. The supply of operating medium, preferably a hydraulic fluid, to hydraulic controller 14 for controlling hydraulic actuator 13 takes place in a manner similar to the manner control system 8 is supplied, i.e., by means of the same pump 11 and via hydraulic feed line 12 which has branch lines leading to the various loads. In addition to hydraulic actuators 7, 13, further loads may also be incorporated. Currently, the speed adjustment of controlled and regulated drives where, as in the present case, triphase asynchronous motors are being used, is favorably accomplished by means of frequency control (Dubbel Taschenbuch für den Maschinenbau [Mechanical Engineering Handbook], 18. edition, 1995, pp. V 40 ff.). The disclosed embodiment includes a prior-art frequency converter that enables a continuous speed adjustment of triphase motors, normally in both directions of rotation. Preferably triphase motor drives with a self-commutated inverter, such as those described in Dubbel, Taschenbuch für den Maschinenbau [Mechanical Engineering Handbook], 18. edition, 1995, on page V 45, are used.

If the plastic extruder does not require the simultaneous operation of the triphase asynchronous motors and the motors may instead be operated sequentially, a joint frequency converter 20 together with a switching device fashioned as a throw-over switch 21 may be used to control the two triphase motors 6 and 10. The decoupling of the two motors is, in this specific embodiment, accomplished by a throw-over switch 21, such as those known from Dubbel, Taschenbuch für den Maschinenbau [Mechanical Engineering Handbook], 18. edition, 1995, pp. V 48 ff.

The triphase asynchronous motors are supplied as described hereafter. Triphase lines 30, 31, 32 run from the mains or from the onboard supply to the frequency converter 20. The frequency converter 20 controls the speed of the electric motors 6, 10 by adjustably feeding the motors via motor feed lines 33, 34, 35. In the present embodiment, the motor feed lines 33, 34, 35 extend to the throw-over switch 21. Selective feeding is accomplished with the aid of the throw-over device either to electric motor 6 via the lines 36, 37 and 38 or to motor 10 by throw-over to feed lines 39, 40, 41. Activation of the electric motors 6 and 10 by frequency converter 20 takes place according to the control characteristics of the asynchronous machine used, (see Dubbel, Taschenbuch für den Maschinenbau [Mechanical Engineering Handbook], 18. edition, 1995, p. V 40). The control characteristics depend on the design of the electric motor. Therefore, triphase asynchronous motors of the same design are favorably provided for driving both the extruder screw 4 and the pump 11. The control characteristics of both asynchronous machines would, therefore, be identical, so that the parameter sets stored in the frequency converter, for example, the ramp adjustment in a digital frequency converter, would not need to be changed when switching over from one electric motor to the other when the load conditions are similar.

When different electric motors are used for driving the pump 11 and the extruder screw 4, the different parameter sets of the respective motors can be stored in the frequency converter having a compact design. The parameter sets are changed when switching over to a different motor.

Another embodiment provides permanently connected triphase feed lines between the frequency converter 20 and the extruder electric motor 6 and a switch permits the feed lines of the pump electric motor 10 to be connected to, and disconnected from, the feed lines leading to electric motor 6. Alternatively, the feed lines leading to electric motor 10 may be permanently connected to the frequency converter 20 with a switch selectively connecting the feed lines of electric motor 6 to the feed lines of electric motor 10. In these latter two embodiments, both electric motors may be operated simultaneously or the electric motor permanently connected to the frequency converter 20 may be operated by itself. In contrast, where the switching device is a throw-over switch 21, only one of the electric motors may be connected to the frequency converter 20 at any one time. Thus, when the electric motors are to be operated sequentially a throw-over switch 21 may be utilized.

The choice of wiring configurations, therefore, depends on the intended operational sequences of the plastic injection molding machine.

A particularly compact embodiment may provide for integrating the frequency converter 20 and the switching device in a common housing.

Using a joint frequency converter for activation of different electric motors for driving a plastic injection molding machine, in contrast to prior-art plastic extruders having multiple converters, thus makes it possible to produce a compactly designed plastic injection molding machine at a reduced cost.

What is claimed is:

1. An electrohydraulic hybrid drive for a plastic injection molding machine having a plasticating section and a tooling section, said drive comprising:
    a hydraulic actuator operatively connected to one of the plasticating section and the tooling section;
    a feed system which supplies hydraulic fluid for actuation of said hydraulic actuator;
    a first electric motor operatively connected to said feed system;
    a further actuator operatively connected to the other of the plasticating section and the tooling section:
    an extruder screw comprising a portion of the plasticating section;
    a second electric motor operatively connected to said extruder screw;
    a frequency converter electrically circuited to said first and second electrical motors whereby said frequency converter may actuate said first and second electrical motors; and
    a switching device electrically circuited to said frequency converter and to at least one of said first electrical motor and said second electrical motor.

2. The electrohydraulic hybrid drive of claim 1 wherein said switching device is electrically circuited to said first and second electrical motors and said switching device is a throw-over switch.

3. The electrohydraulic hybrid drive of claim 2 wherein said feed system further comprises a pump driven by said first electrical motor and said pump is one of a speed-controlled fixed-displacement pump and a variable-displacement pump.

4. The electrohydraulic hybrid drive of claim 2 wherein said first and second electric motors are triphase asynchronous motors.

5. The electrohydraulic hybrid drive of claim 2 wherein said hydraulic actuator is a cylinder.

6. The electrohydraulic hybrid drive of claim 2 wherein said first and second electrical motors have substantially similar control characteristics.

7. The electrohydraulic hybrid drive of claim 2 wherein said first and second electrical motors have substantially similar ratings.

8. The electrohydraulic hybrid drive of claim 2 wherein said first and second electrical motors have different ratings and said frequency converter includes a first parameter set for controlling a first output of said frequency converter, said first output coordinated with said first electrical motor, and said frequency converter includes a second parameter set for controlling a second output of said frequency converter, said second output coordinated with said second electrical motor; and said frequency converter utilizes said first parameter set for actuating said first electrical motor and utilizes said second parameter for actuating said second electrical motor.

9. The electrohydraulic hybrid drive of claim 1 wherein said switching device is electrically circuited to said second electrical motor whereby said second electrical motor is actuated parallel to said first electrical motor by closing said switching device.

10. The electrohydraulic hybrid drive of claim 9 wherein said feed system further comprises a pump driven by said first electrical motor and said pump is one of a speed-controlled fixed-displacement pump and a variable-displacement pump.

11. The electrohydraulic hybrid drive of claim 9 wherein said first and second electric motors are triphase asynchronous motors.

12. The electrohydraulic hybrid drive of claim 9 wherein said hydraulic actuator is a cylinder.

13. The electrohydraulic hybrid drive of claim 9 wherein said first and second electrical motors have substantially similar control characteristics.

14. The electrohydraulic hybrid drive of claim I wherein said switching device is electrically circuited to said first electrical motor whereby said first electrical motor is actuated parallel to said second electrical motor by closing said switching device.

15. The electrohydraulic hybrid drive of claim 1 wherein said feed system further comprises a pump driven by said first electrical motor and said pump is one of a speed-controlled fixed-displacement pump and a variable-displacement pump.

16. The electrohydraulic hybrid drive of claim 1 wherein said first and second electric motors are triphase asynchronous motors.

17. The electrohydraulic hybrid drive of claim 1 wherein said hydraulic actuator is a cylinder.

18. The electrohydraulic hybrid drive of claim 1 wherein said first and second electrical motors have substantially similar control characteristics.

19. The electrohydraulic hybrid drive of claim 1 wherein said first and second electrical motors have substantially similar ratings.

20. The electrohydraulic hybrid drive of claim 1 wherein said first and second electrical motors have different ratings and said frequency converter includes a first parameter set for controlling a first output of said frequency converter, said first output coordinated with said first electrical motor, and said frequency converter includes a second parameter set for controlling a second output of said frequency converter, said second output coordinated with said second electrical motor; and said frequency converter utilizes said first parameter set for actuating said first electrical motor and utilizes said second parameter for actuating said second electrical motor.

21. The electrohydraulic hybrid device of claim 1 wherein said further actuator is a hydraulic actuator and said feed system supplies hydraulic fluid for actuation of said further hydraulic actuator.

* * * * *